US007771558B2

United States Patent

(12) United States Patent
Maeda et al.

(10) Patent No.: US 7,771,558 B2
(45) Date of Patent: Aug. 10, 2010

(54) ADHESIVE AND METHOD OF MANUFACTURING IMAGE DISPLAY APPARATUS USING THE SAME

(75) Inventors: Reiko Maeda, Kawasaki (JP); Yasuhiro Tanaka, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 641 days.

(21) Appl. No.: 11/226,285

(22) Filed: Sep. 15, 2005

(65) Prior Publication Data

US 2006/0060288 A1 Mar. 23, 2006

(30) Foreign Application Priority Data

Sep. 22, 2004 (JP) ............................ 2004-274956

(51) Int. Cl.

| | |
|---|---|
| ***A61F 13/15*** | (2006.01) |
| ***B29C 65/00*** | (2006.01) |
| ***B32B 37/00*** | (2006.01) |
| ***C04B 37/00*** | (2006.01) |
| ***H01J 9/00*** | (2006.01) |
| ***H01J 9/24*** | (2006.01) |

(52) U.S. Cl. .......................... 156/325; 156/163; 445/24

(58) Field of Classification Search ................. 156/163, 156/325; 445/24

See application file for complete search history.

(56) References Cited

U.S. PATENT DOCUMENTS

| | | | | |
|---|---|---|---|---|
| 3,186,857 | A * | 6/1965 | Freyhold et al. | 106/620 |
| 3,444,732 | A * | 5/1969 | Mckinley et al. | 73/150 A |
| 3,498,807 | A * | 3/1970 | Gresham | 106/628 |
| 3,625,722 | A * | 12/1971 | Freyhold et al. | 106/634 |
| 3,959,063 | A * | 5/1976 | Hawthorne | 156/325 |
| 4,632,749 | A * | 12/1986 | Hilfman | 208/120.01 |
| 4,806,327 | A * | 2/1989 | Rieck et al. | 423/332 |
| 6,152,796 | A * | 11/2000 | Nakata | 445/24 |
| 6,497,945 | B1 * | 12/2002 | Niedner et al. | 428/304.4 |
| 2003/0192458 | A1 * | 10/2003 | Brykov et al. | 106/626 |
| 2004/0137820 | A1 * | 7/2004 | Yakou et al. | 445/24 |
| 2004/0244909 | A1 * | 12/2004 | Rhodes et al. | 156/325 |

FOREIGN PATENT DOCUMENTS

| | | |
|---|---|---|
| JP | 2000-21310 | 1/2000 |
| JP | 2000-57937 | 2/2000 |

* cited by examiner

*Primary Examiner*—Philip C Tucker
*Assistant Examiner*—Michael N Orlando
(74) *Attorney, Agent, or Firm*—Fitzpatrick, Cella, Harper & Scinto

(57) ABSTRACT

An adhesive used for bonding a spacer to a face plate and a rear plate constituting an envelope of an image display apparatus so as to keep space between the face plate and the rear plate. Since the adhesive contains an aqueous sodium silicate solution and Ti grains dispersed in the aqueous solution, it improves adhesion and shortens curing time.

4 Claims, 4 Drawing Sheets

ADHESIVE AND METHOD OF MANUFACTURING IMAGE DISPLAY APPARATUS USING THE SAME

BACKGROUND OF THE INVENTION

1. Field of the Invention

The present invention relates to an adhesive used particularly for manufacturing an image display apparatus, and a method of manufacturing an image display apparatus using the same.

2. Related Background Art

Heretofore, as an alternative display apparatus to cathode-ray tube display apparatuses, thin and lightweight flat-panel display apparatuses have been attracting attention. In particular, display apparatuses in which an electron source and a phosphor emitting light upon irradiation with an electron beam are combined are expected to have superior properties compared to other conventional display apparatuses. For example, compared to liquid crystal display apparatuses, which have recently become widespread, the above flat-panel display apparatuses have an advantage in that no backlight is required because they are self-luminous and that they have a broad view angle.

FIG. 8 is a schematic cross-sectional view of a flat-panel image display apparatus. As FIG. 8 shows, a rear plate 101, on which an electron source having a plurality of electron-emitting devices 102 are formed, an outer frame 105, and a face plate 108, on which a phosphor 111, a blacks tripe 110 and an anode (metal back) 109 are formed, constitute an envelope (hermetically sealed container) for maintaining a vacuum inside the display panel.

The inside of the hermetically sealed container 7 is maintained at a vacuum. As the display area of the image display apparatus is enlarged, it becomes necessary to have a means for preventing deformation or breakage of the rear plate 101 and the face plate 108 due to a difference in air pressures between the inside and the outside of the hermetically sealed container. Thus, a plurality of spacers 104 are disposed in the hermetically sealed container as a structural support for withstanding the atmospheric pressure.

These spacers 104 are bonded at least to either the face plate 108 or the rear plate 101 using adhesive 107, 106. As the adhesive, an alkali metal silicate adhesive, a metal phosphate acidic adhesive or a chemical reaction inorganic adhesive, such as colloidal silica, may be used (Japanese Patent Application Laid-Open Nos. 2000-021310 and 2000-057937).

The above chemical reaction inorganic adhesives have advantages in that they suppress the influence of an organic gas on bonded materials can bond at a relatively low temperature, and have excellent heat resistance. However, further improvements are desired in adhesion and shortening of the time necessary for curing.

SUMMARY OF THE INVENTION

The present invention aims at providing an adhesive having both improved adhesion and shortened curing time.

The present invention relates to an adhesive comprising an aqueous sodium silicate solution and Ti grains dispersed in the aqueous sodium silicate solution.

The present invention also relates to a method of manufacturing an image display apparatus comprising a face plate equipped with an image display member, a rear plate equipped with an electron source, and a spacer disposed between the face plate and the rear plate, the method comprising a step of bonding a spacer to the face plate or the rear plate using an adhesive comprising an aqueous sodium silicate solution and Ti grains dispersed in the aqueous sodium silicate solution.

DETAILED DESCRIPTION OF THE PREFERRED EMBODIMENTS

Figure 1:
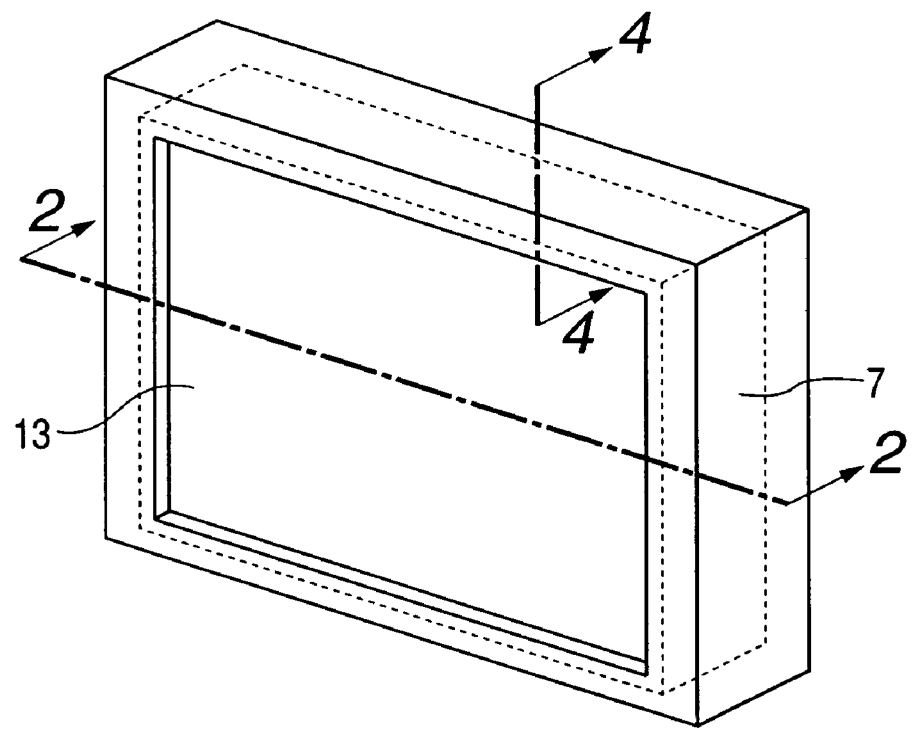
FIG. 1 is a schematic view of a display panel of an image display apparatus.

The present invention provides an adhesive comprising an aqueous sodium silicate solution and Ti grains dispersed in the aqueous sodium silicate solution.

The present invention also provides a method of manufacturing an image display apparatus comprising a face plate equipped with an image display member, a rear plate equipped with an electron source, and a spacer disposed between the face plate and the rear plate, the method comprising a step of bonding a spacer to the face plate or the rear plate using an adhesive comprising an aqueous sodium silicate solution and Ti grains dispersed in the aqueous sodium silicate solution.

The adhesive of the present invention is capable of bonding materials in a short time and is excellent in adhesion despite the short bonding time.

Embodiments of the present invention will be described below.

First, the adhesive of the present invention contains an aqueous sodium silicate solution and titanium (Ti) grains dispersed in the solution.

Because the adhesive of the present invention is inorganic, substantially no organic gas is generated. In particular, when the adhesive is used for an image display apparatus as described later, degradation of the electron source due to organic gas can be prevented.

As the aqueous sodium silicate solution, a solution containing 10% by weight to 20% by weight of water and having a $SiO_2/Na_2O$ molar ratio of 1.6 to 3.0 is preferred.

A water content of not less than 10% by weight is preferable because handling of an adhesive is easy and the adhesive can be easily applied to spacers. A water content of not more than 20% by weight is preferable because foaming is further decreased and less likely to occur even by rapid heating when the amount of water, which causes foaming, is previously minimized.

A molar ratio of $SiO_2/Na_2O$ of not less than 1.6 is preferable from the viewpoint of water resistance, and a molar ratio of $SiO_2/Na_2O$ of not more than 3.0 is preferable from the viewpoint of adhesion.

In this regard, the larger the molar ratio, the larger the water resistance and the fewer needle crystals are generated. To prevent an Na needle crystal from being formed on the surface of the adhesive, a higher molar ratio of $SiO_2/Na_2O$ is preferred. The adhesion reaches the maximum at a molar ratio of about 3.0.

The adhesive of the present invention contains Ti grains, and this gives an advantage that the elastic modulus (hardness) of the adhesive is hardly decreased even if it is heated to the curing temperature or higher.

This advantage leads to prevention of lowering of the tension of a spacer caused by decreased elastic modulus of the adhesive when the adhesive is used for bonding a spacer as described below. Therefore, the adhesive can withstand heating processes after fixing spacers and accuracy of the spacer position can be maintained.

To make further use of the above-described advantage, the adhesive may contain 10% by weight to 68% by weight of Ti grains.

In addition, when a commercially available sodium silicate adhesive is rapidly heated to 100° C. or more, water in the adhesive rapidly boils and causes foaming or an explosion of the adhesive. Thus, the required cohesion and adhesion may not be easily obtained when such short-time adhesion under rapid heating is performed. For this reason, when curing a commercially available sodium silicate adhesive, the adhesive must be generally pre-dried until water is thoroughly evaporated and then gradually heated, which requires a substantial amount of time.

Since the adhesive of the present invention contains Ti grains, the above-described foaming or the explosion due to sudden boiling of water hardly occurs. Therefore, adhesion can be performed in short period of time under rapid heating. Further, the adhesive may contain at least one member selected from ZrO grains, Ni grains, Ag grains, Au grains and $Al_2O_3$ grains because adhesion can be performed in an even shorter period of time under rapid heating.

The above-described grains may have an average grain size of preferably 1.0 μm to 200 μm, more preferably 5.0 μm to 50 μm, so that adhesion can be performed in an even shorter period of time under rapid heating.

When the adhesive contains at least one member selected from ZrO grains, Ni grains, Ag grains, Au grains and $Al_2O_3$ grains as a second grain other than Ti grains, it is preferable that the adhesive contains a second grain having an average grain size different from the average grain size of the Ti grains because the cohesion of grains can be improved and the adhesion can be further improved.

Of the above-described second grains, $Al_2O_3$ grains having an average grain size of 1.0 μm to 10 μm are more preferable because they enhance the above-described advantage that the elastic modulus (hardness) of the adhesive is hardly decreased even if it is heated to the curing temperature or higher.

In addition, some commercially available sodium silicate adhesives suffer from Na bleeding from the inside due to absorption of water in the air when the adhesive is allowed to stand, and a needle crystal containing Na as a main component may be formed. When the adhesive is used for an image display apparatus as described later, such Na needle crystal adheres to the electron source and may cause degradation of the electron source.

Since the adhesive of the present invention contains Ti grains, generation of the Na needle crystals can be reduced. It is preferable that the adhesive also contain phosphoric acid or boric acid to further reduce generation of the Na needle crystals. In particular, it is more preferable that the adhesive contain boric acid.

The amount of the above-described phosphoric acid or boric acid is within the range of preferably 0.1% by weight to 10.0% by weight, more preferably 0.5% by weight to 3.0% by weight for the same reason as described above.

In the following, an embodiment of the method of bonding a spacer in an image display apparatus using the above-described adhesive of the present invention will be described.

Figure 2:
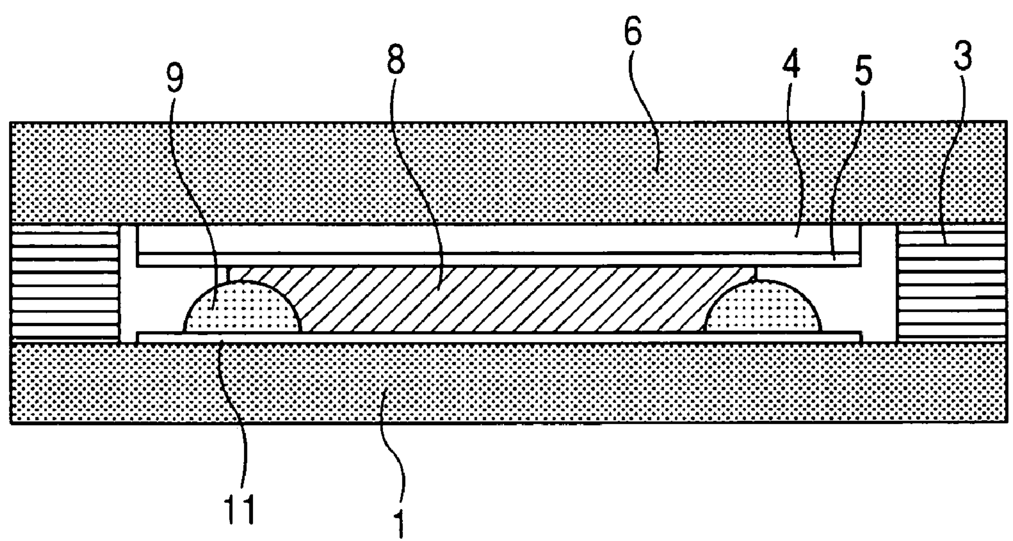
FIG. 2 is a schematic cross-sectional view of the image display apparatus taken on line 2-2 of FIG. 1.

FIG. 1 a schematic view of a display panel of the image display apparatus of this embodiment, in which an image display area 13 is formed in a hermetically sealed container 7 (envelope). FIG. 2 is an enlarged schematic cross-sectional view taken on line 2-2 of FIG. 1.

Figure 3:
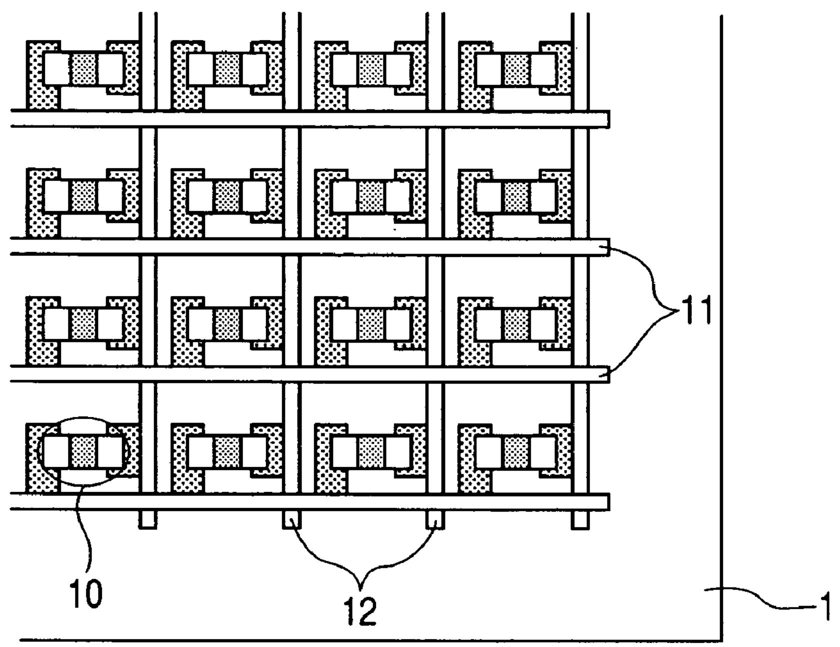
FIG. 3 is an enlarged schematic plan view of a rear plate 1 of the image display apparatus shown in FIG. 2.

The hermetically sealed container 7 of FIG. 1 is composed of a face plate 6, an outer frame 3 and a rear plate 1 as shown in FIG. 2. A plurality of electron-emitting devices 10, with a plurality of longitudinal wiring 11 and a plurality of transverse wiring 12 wired in matrix, are disposed on the rear plate 1 of FIG. 2 as shown in FIG. 3. At junctions of the longitudinal wiring 11 and the transverse wiring 12, an insulation layer unrepresented in the figure is formed, by which the longitudinal wiring 11 and the transverse wiring 12 are electrically insulated from each other.

Further, as shown in FIG. 2, a fluorescent screen 4 and an anode (metal back) 5 covering the screen are formed on the face plate 6.

As shown in FIG. 2, the spacer 8 in this embodiment is in the form of a plate, which is disposed on the longitudinal wiring 11 and contacted to the metal back 5.

Figure 4:
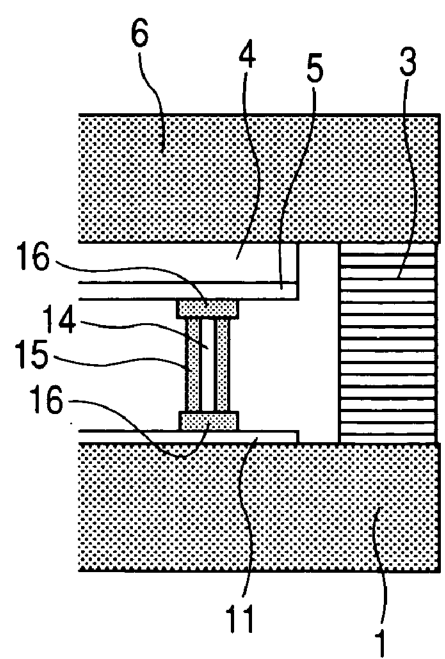
FIG. 4 is an enlarged schematic cross-sectional view of the image display apparatus taken on line 4-4 of FIG. 1.

FIG. 4 is an enlarged schematic cross-sectional view of the image display apparatus taken on line 4-4 of FIG. 1. As shown in FIG. 4, the spacer 8 is composed of a resistance film (high resistance film) 15 for preventing static electricity formed on the surface of an insulation member 14 and a resistance film (low resistance film) 16 having a lower resistance than the resistance film 15 formed on the top and the bottom contacting the metal back 5 on the face plate 6 side and the longitudinal wiring 11 on the rear plate 1 side.

A required number of spacers 8 is disposed at a required interval so that the hermetically sealed container 7 maintained at a vacuum of about $10^{-4}$ Pa is not destroyed by atmospheric pressure or sudden impact. In addition, both sides of the spacers are fixed by adhesive 9 to the face plate 6 or the rear plate 1 as shown in FIG. 2.

As the insulation member 14 of the spacer 8, for example, quartz glass, glass containing a reduced amount of impurities, such as Na, soda lime glass or a ceramic, such as alumina, is used.

As the high resistance film 15, those having a surface resistivity of $10^5$ Ω/∇ to $10^{14}$ Ω/∇ are preferred so as to maintain the antistatic effect and reduce electricity consumption by leak current.

As the material of the high resistance film 15, for example, an oxide of chromium, nickel or copper, carbon, a nitride of germanium and transition metal, or a nitride of aluminum and transition metal is used.

The low resistance film 16 may have a resistance sufficiently lower than that of the high resistance film 15, and a metal, such as Ni, Cr, Ag, Au, Mo, W, Pt, Ti, Al, Cu or Pd or an alloy thereof, may be used as the material.

The method of bonding the spacer 8 will now be described with reference to FIG. 2.

The spacer 8 is disposed in the image display area and its periphery, and both sides of the spacer 8 are bonded to the rear plate 1 on the outside of the image display area by the above-described adhesive 9 of the present invention.

Referring to the method of bonding, both sides of the plate-like spacer 8 are first pulled outward to generate tension and reform the shape.

Then, while maintaining the tension, the spacer 8 is disposed at a pre-determined position on the longitudinal wiring 11. The above-described adhesive 9 of the present invention is then applied to both sides of the spacer 8, and the spacer 8 is bonded to the longitudinal wiring 11 of the peripheral area by heating the adhesive 9 to 130° C. to 250° C.

When bonding the spacer 8 using the adhesive 9 of the present invention, heating is preferably performed at a temperature increase rate of not less than 50° C./minute because bonding can be completed in a short time. Even in such rapid heating, foaming or explosion due to sudden boiling of water in the adhesive 9 hardly occurs. In addition, since the adhesive is excellent in adhesion and hardness, spacers can be securely fixed.

The following describes an embodiment of the method of sealing of a rear plate 1 on which a plurality of electron-emitting devices arranged in a matrix and a plurality of spacers 8 bonded by the adhesive 9 of the present invention are disposed, a face plate 6 on which a fluorescent screen 4 and a metal back 5 are disposed, and an outer frame 3 shown in FIG. 2.

The outer frame 3 is bonded to the rear plate 1 using frit glass. A sealing material of a low melting point substance, such as frit glass, a low melting point metal, such as indium or an alloy thereof, is applied to the face plate 6 over the portion facing the outer frame 3. The sealing material may be applied to the outer frame 3 over the portion facing the face plate 6.

The rear plate 1 and the face plate 6 are heated to 300° C. to 400° C. in a vacuum of about $10^4$ Pa for baking so as to remove the impurity gas from the rear plate 1 and the face plate 6.

Then, without exposing to the ambient air, a getter film of Ba or the like is formed on the surface of the metal back 5 of the face plate 6, and after that, the rear plate 1 and the face plate 6 are positioned face to face so that the electron-emitting device and the metal back 5 are faced with each other. The sealing material is then heated in an atmosphere of not more than $10^{-6}$ Pa and the face plate 6 and the rear plate 1 are brought close together so as to bond the face plate 6 to the outer frame 3, whereby a hermetically sealed container (envelope) constituted by the face plate 6, the outer frame 3 and the rear plate 1 in which the degree of vacuum is not more than $10^{-6}$ Pa is formed.

A display panel of an image display apparatus is formed as described above, on which a drive circuit and the like are mounted to manufacture an image display apparatus.

Because the elastic modulus of the adhesive is hardly decreased even in the above-described baking at 300° C. to 400° C., the spacer in the display panel described above can withstand such heating processes and accuracy of the spacer position can be maintained.

EXAMPLES

Examples of adhesives of the present invention and the results of evaluating the adhesion, the hardness and the like of the adhesives are specifically described below.

Examples 1 to 7

First, 16.25 g of sodium silicate (Water Glass No. 1 available from Kishida Chemical Co., Ltd.) was diluted by 16.25 g of water to prepare an aqueous sodium silicate solution. To 32.5 g of the prepared aqueous sodium silicate solution was added 67.5 g of Ti powder (45 μm, available from Kishida Chemical Co., Ltd.) to give an adhesive A of Example 1.

Adhesives B to G of Examples 2 to 7 shown in Table 1 were prepared in the same manner as above.

The above adhesives A to G of the present Examples were evaluated by the following method.

Figure 5:
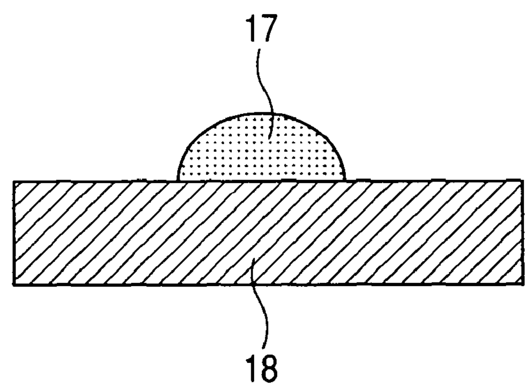
FIG. 5 is a schematic cross-sectional view of cured adhesive.
Figure 6:
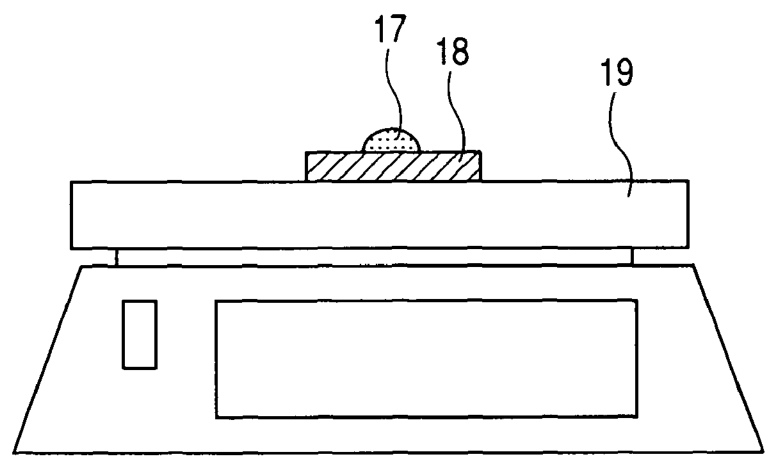
FIG. 6 is a schematic side view illustrating a method of curing of adhesive for evaluation.

FIG. 6 is a schematic side view illustrating a method of curing of the adhesive for evaluation. FIG. 5 is a schematic cross-sectional view of the cured adhesive.

As FIG. 5 shows, 4 mg of an adhesive for evaluation 17 is dropped on a glass substrate 18 having a thickness of 2.8 mm, and the glass substrate 18 was immediately transferred to a hot plate 19 heated to 160° C. shown in FIG. 6 and heated for 2 minutes. The temperature of the top face of the adhesive for evaluation 17 was 130° C. as measured by a thermocouple. The adhesives A to G of the present Examples were used as the adhesives for evaluation 17.

Cured products of the adhesives A to G of the present Examples were prepared by the above-described curing method and the cross-section of the cured products was visually observed. As a result, no foaming was found in adhesives A to G as shown in Table 1.

Further, cured products of the adhesives A to G of the present Examples were prepared by the above-described curing method, and the out gas was measured by a thermal desorption spectrometry apparatus (TDS, made by ESCO, LTD.). Regarding the conditions of measuring the out gas, a test piece was placed in a high vacuum (about $1.0\times10^{-9}$ Torr), and the temperature of the test piece was increased from 20° C. to 400° C. (temperature increase rate: 5° C./minute) and maintained at 400° C. for 60 minutes, and elements released during the period were measured using a mass spectrometer. As a result, no organic substance was released from any of the adhesives A to G as shown in Table 1.

Next, the adhesion of the adhesives was evaluated as follows.

Figure 7:
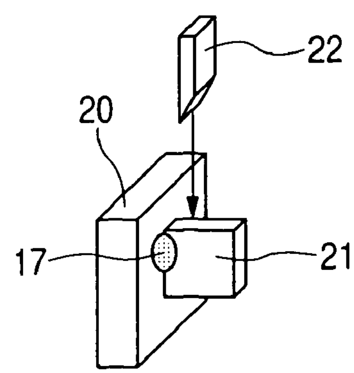
FIG. 7 is a schematic view of a measurement system of adhesion.
Figure 8:
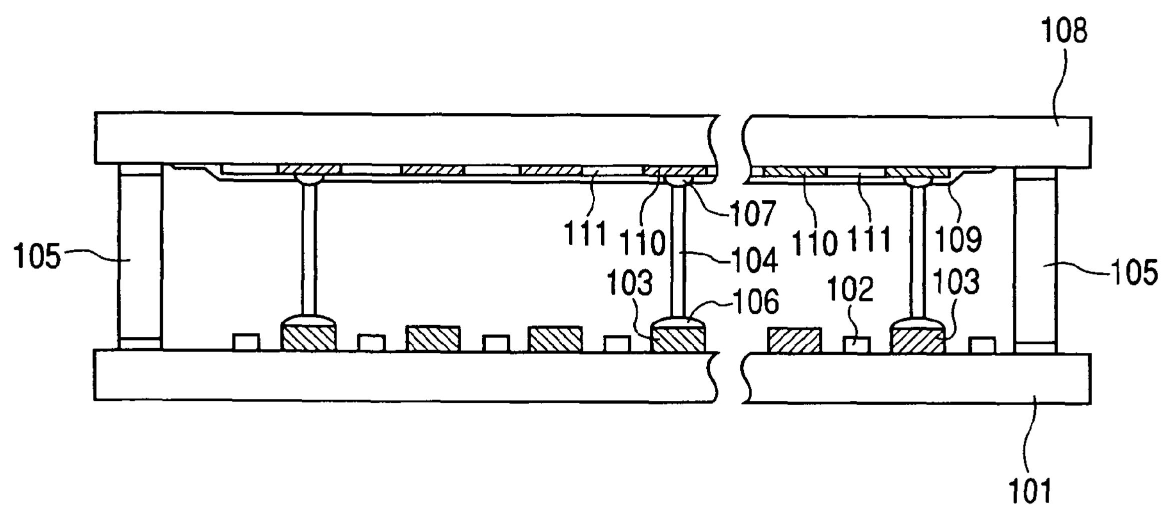
FIG. 8 is a schematic cross-sectional view of a conventional image display apparatus.

FIG. 7 is a schematic view of a system for measuring adhesion. For measuring adhesion of the adhesive for evaluation 17, a glass test piece 21 was placed on a glass test piece 20 and 4 mg of each of the adhesive for evaluation 17 was dropped on both sides of the glass test piece 21. Then, the glass test piece 20 was immediately transferred to a hot plate heated to 160° C. and heated for 2 minutes. The sample, after heating, was cooled at room temperature and a load was applied to the surface of the glass test piece 21 where no adhesive was applied by a sharp-edged compression jig 22 in the compression direction at a rate of 0.2 mm/min, as shown in FIG. 7, to measure the load at the break. A tensile tester (5583, made by INSTRON Corporation) was used for measuring the adhesion.

The adhesives A to G of the present Example were used as the adhesives for evaluation 17. The results of the evaluation of adhesion are as shown in Table 1.

TABLE 1

| Example Adhesive | | | Example 1 Adhesive A | Example 2 Adhesive B | Example 3 Adhesive C | Example 4 Adhesive D | Example 5 Adhesive E | Example 6 Adhesive F | Example 7 Adhesive G | Grain size (μm) | Manufacturer |
|---|---|---|---|---|---|---|---|---|---|---|---|
| Material (g) | Aqueous sodium silicate solution | Sodium silicate | 16.25 | 20 | 14 | 15 | 15 | 14 | 13.72 | | Kishida Chemical Co., Ltd. |
| | | Water | 16.25 | 20 | 14 | 15 | 15 | 14 | 13.72 | — | — |
| | | Boric acid | — | — | — | — | — | — | 0.56 | — | Kishida Chemical Co., Ltd. |
| | Aggregate | Ti | 67.5 | 30 | 36 | 65 | 65 | 36 | 36 | 45 | Kishida Chemical Co., Ltd. |
| | | Ze02 | — | 30 | — | — | — | — | — | — | Kishida Chemical Co., Ltd. |
| | | Ni | — | — | 36 | — | — | — | — | 75 | Kishida Chemical Co., Ltd. |
| | | Ta | — | — | — | 5 | 2.5 | — | — | 45 | Kishida Chemical Co., Ltd. |
| | | Au | — | — | — | — | 2.5 | — | — | 2 | Kishida Chemical Co., Ltd. |
| | | Al203 | — | — | — | — | — | 36 | 36 | 5 | Kishida Chemical Co., Ltd. |
| Properties | Occurrence of foaming | | no foaming | no foaming | no foaming | no foaming | no foaming | no foaming | no foaming | — | — |
| | Out gas | | no organic substance | no organic substance | no organic substance | no organic substance | no organic substance | no organic substance | no organic substance | — | — |
| | Adhesion (N) | | 40 | 32 | 34 | 41 | 41 | 40 | 37 | — | — |

The hardness of the adhesives A to G of the present Examples was measured after curing using a Vickers hardness tester (HMV-FA, made by Shimadzu Corporation), and as a result, the adhesives F, G of the present Examples had the highest hardness of 62.

Also, the hardness of the adhesives A to G of the present Examples was measured after curing and further heating in a constant temperature furnace at 400° C. for 60 minutes using the Vickers hardness tester. As a result, the adhesives F, G of the present Examples had the highest hardness of 72, and a decrease in the hardness was not observed.

Further, no Na needle crystal of 1 μm or more was observed on the surface of the cured product of the adhesive G of the present Examples after the above-described curing.

Comparative Example 1

For Comparative Example 1, ARON CERAMIC D (available from TOAGOSEI Co., Ltd.) containing an aqueous sodium silicate solution and $Al_2O_3$, $SiO_2$ and $ZrO_2$ was obtained.

Properties were evaluated in the same manner as in Examples 1 to 7, and as a result, foaming of adhesive was found in the visual observation of the cross-section of the cured product of the adhesive. In the measurement of the out gas, no organic substance was detected. The adhesion was measured to be 28N.

The Vickers hardness was measured in the same manner as in Examples 1 to 7, and as a result, the hardness was 65. The cured product was further heated in a constant temperature furnace at 400° C. for 60 minutes and then the hardness was measured using the Vickers hardness tester in the same manner as in Examples 1 to 7. As a result, the hardness decreased to 41.

The surface of the cured product was observed by a field emission scanning electron microscope (FE-SEM/S-4500, made by Hitachi, Ltd.), and as a result, an Na needle crystal of 1 μm or more was observed.

Comparative Example 2

For Comparative Example 2, ARON CERAMIC W (available from TOAGOSEI Co., Ltd.) which contains the same components as ARON CERAMIC D and has been made water resistant was obtained.

Properties were evaluated in the same manner as in Comparative Example 1, and as a result, foaming of adhesive was found in the visual observation of the cross-section of the cured product of the adhesive. In the measurement of the out gas, no organic substance was detected. The adhesion was measured to be 32N.

The Vickers hardness was measured in the same manner as in Examples 1 to 7, and as a result, the hardness was 60. The cured product was further heated in a constant temperature furnace at 400° C. for 60 minutes and then the hardness was measured using the Vickers hardness tester in the same manner as in Examples 1 to 7. As a result, the hardness decreased to 47.

The surface of the cured product was observed by a field emission scanning electron microscope (FE-SEM/S-4500, made by Hitachi,. Ltd.), and as a result, no Na needle crystal of 1 μm or more was observed.

This application claims priority from Japanese Patent Application No. 2004-274956 filed Sep. 22, 2004, which is hereby incorporated by reference herein.

What is claimed is:

1. A method of manufacturing an image display apparatus comprising a face plate equipped with an image display member, a rear plate equipped with an electron source, and a spacer disposed between the face plate and the rear plate, the method comprising a step of bonding a spacer to the face plate or the rear plate using an adhesive comprising an aqueous solution of sodium silicate, the bonding step comprising heating the adhesive at a temperature increase rate of not lower than 5° C./minute, wherein a molar ratio of $SiO_2/Na_2O$ in the aqueous solution is from 1.6 to 3.0, wherein the aqueous solution contains from 30% by weight to 65% by weight of Ti grains, and at least one type of other grains selected from the group consisting of $ZrO_2$ grains, Ni grains, Au grains, Ta grains, and $Al_2O_3$ grains, wherein an average grain size of the Ti grains, $ZrO_2$ grains, Ni grains, Au grains, Ta grains, and $Al_2O_3$ grains is, respectively, from 1.0 μm to 200 μm, and wherein the aqueous solution contains from 10 to 20% by weight of water.

2. The method of manufacturing an image display apparatus according to claim 1, wherein the temperature increase rate is not lower than 50° C./minute.

3. The method of manufacturing an image display apparatus according to claim 1, wherein the aqueous solution also contains from 0.1% by weight to 10.0% by weight of phosphoric acid or boric acid.

4. The method of manufacturing an image display apparatus according to claim 1, wherein the at least one type of other grains is selected from the group consisting of Au grains and Ta grains.

* * * * *